UNITED STATES PATENT OFFICE.

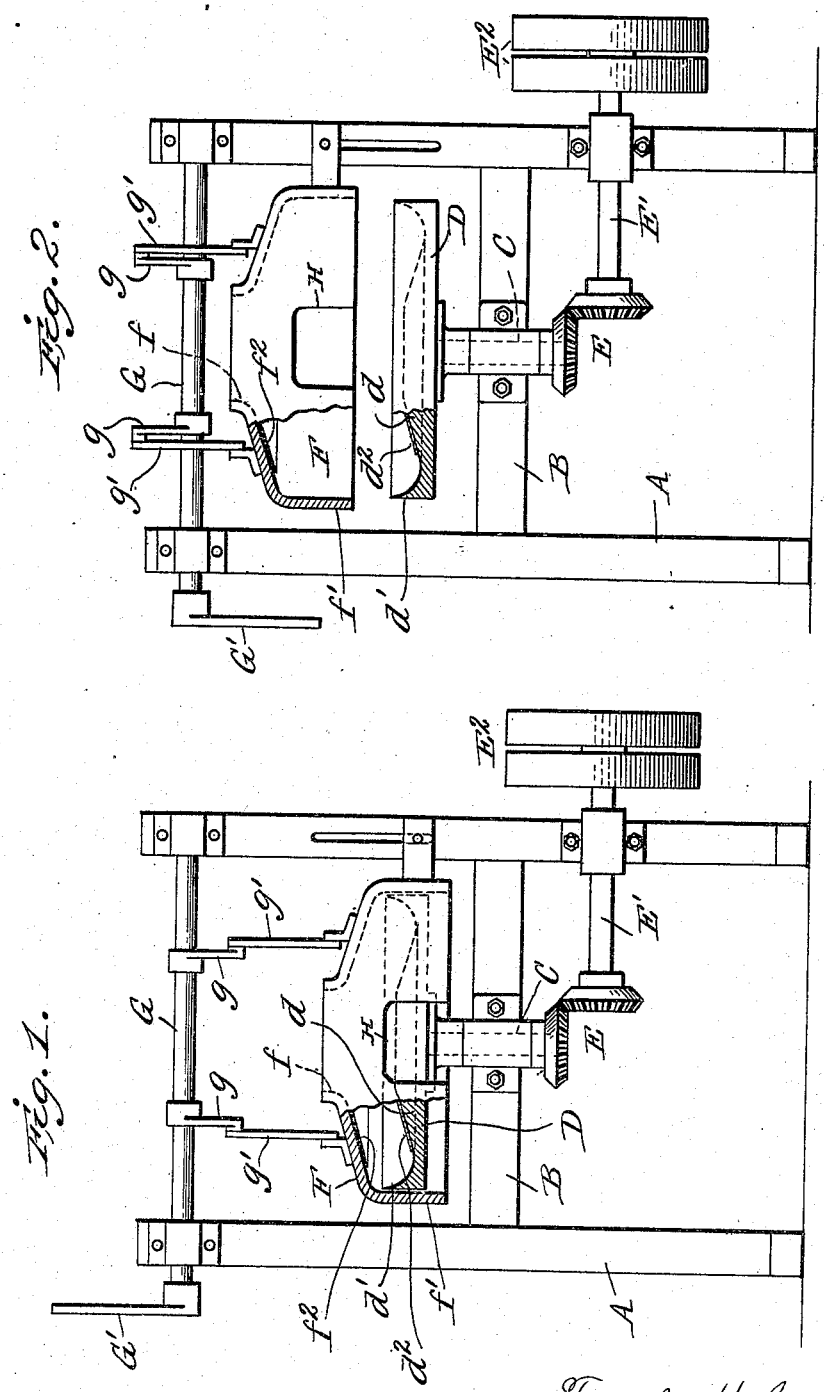

FRANK HENRY VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH MOLDING OR SHAPING MACHINE.

942,153.   Specification of Letters Patent.   Patented Dec. 7, 1909.

Application filed June 4, 1908. Serial No. 436,674.

*To all whom it may concern:*

Be it known that I, FRANK H. VAN HOUTEN, a citizen of the United States, residing at Fishkill-on-the-Hudson, in the county of Dutchess, State of New York, have invented certain new and useful Improvements in Dough Molding or Shaping Machines; and I do hereby declare the following to be a full, clear, and exact description of the same, reference being had to the accompanying drawings, forming a part of this specification, and to the characters of reference marked thereon.

The present invention relates to improvements in machines designed primarily for forming and surfacing irregular lumps of dough, particularly the lumps which have passed through a dough dividing machine and are ready to be prepared for final rising and baking.

One object of the invention is to provide a machine which will form and, to a certain extent, knead the dough and impart a suitable surface tension thereto such as will insure the production of a uniform homogeneous body not liable to separate on lines where different portions of the surface have been brought together in the forming operation.

It is a further object of the invention to provide a compact machine in which the lumps of dough may be subjected to an extended travel with relation to the forming surface without the necessity of providing a machine of large dimensions.

A further object of the invention is to provide a machine which will operate around an axis with a comparatively short radius, whereby the floor area occupied may be reduced to the smallest possible dimensions.

A further object of the invention is to provide a machine which will by a rotary action give form to the lump of dough by causing the portion at or near the surface of the lump to travel or converge toward a point where it will be worked into the body of the sphere or lump in simulation of the ordinary hand manipulation, but without leaving non-adherent contacting surfaces in the body of the dough itself.

Broadly, the invention consists in a machine wherein the lump of dough is formed between relatively angularly movable coöperating forming surfaces operating at sufficient speed to cause the lump of dough to be acted on by centrifugal force and a confining wall conforming to the angular path of travel of the lump of dough for restricting its movement under centrifugal force. More specifically, the invention consists in a rotary head constituting one of the forming surfaces and a relatively fixed or non-rotating coöperating forming surface between which surfaces the lump of dough is confined and formed by the action of said surfaces and centrifugal force.

The invention further consists in certain novel details of construction and combinations and arrangements of parts all of which will be hereinafter described and pointed out particularly in the appended claims.

Referring to the accompanying drawings: Figure 1 is an elevation, partly in section, of a forming machine embodying the present invention, all unnecessary operating mechanism and parts being omitted in order that the invention may be more clearly understood. Fig. 2 is a similar view showing the cover or upper forming surface elevated for cleaning or for the discharge of the formed lumps.

In the simple machine illustrated, and which will be understood may constitute one unit of a machine embodying a succession of similar units, the letter A indicates the fraework, having a suitable cross piece B in which is journaled a vertical shaft C. At its upper end the shaft C carries a rotary head D, and at its lower end a driving connection of any suitable character capable of imparting a relatively high speed of rotation to the head. As a convenient driving connection, a pair of beveled gears E is interposed between the shaft C and a horizontal drive shaft E', carrying fast and loose pulleys $E^2$, as will be readily understood. The upper forming face of the rotary head D, while it may be substantially plain and horizontal, as indicated by the dotted lines, is preferably somewhat inclined or cone-shaped at the center, as shown at d, the outer edge of the conical portion merging into a smoothly rounded and upwardly curved interior peripheral wall d' forming, as it were, a dishlike recess or channel in which the lump of dough may rest and travel, as will be presently explained.

The upper outer edge of the rotary head is preferably made relatively thin or tapered down to a sharp edge which will fit quite accurately within the cover or relatively fixed member of the forming surfaces in order that the dough may not escape between the meeting portions of the surfaces. The relatively fixed member is in the form of a cap or cover F, having a central entrance opening $f$ and a peripheral rim $f'$, which is normally adapted to surround the rotary head, the wall of the member F between the entrance opening $f$ and rim, preferably, conforming generally to the angle of the inner face of the rotary head itself, with the result that the annular space between the two forming surfaces has substantially parallel top and bottom walls and a curving or rounding peripheral wall, and the general shape of the channel is maintained, even though the distance between the two surfaces is varied, as may be found necessary in operating on large or small lumps of dough with the same machine.

Any preferred means may be employed for adjustably or movably supporting the relatively fixed or non-rotating forming member, and for purposes of illustration a shaft G is provided with crank arms $g$, connected by links $g'$ with the member F, and a handle G′ at one end of the shaft serves as a convenient means whereby the member F may be raised or lowered or held in any desired position with relation to the rotary head, although in some instances it may well be allowed to rest on the lump of dough being formed between the forming surfaces.

In operation, a lump of dough dropped through the opening $f$ on to the rapidly rotating head D is instantly caused to move outwardly between the proximate forming surfaces of the head and cover by centrifugal force and at the same time it is given a rotation on an axis which is intermediate the two surfaces owing to the retarding effect of the upper surface. The action of the two surfaces alone tends to cause the portion of the mass at the greatest distance from the axis to spread out to a greater extent than the portion of the mass nearer to the axis, and this fact is taken advantage of in the machine of the present invention in order to secure a more efficient kneading, forming and surface tensioning of the dough, for which reason it is preferred that the rotary head and the coöperating forming member shall be of relatively small diameter, preferably with a radius not exceeding two or three times the diameter of the lump of dough to be operated upon. It will be readily understood that the smaller the diameter of the rotary head the greater will be the relative movement at the inner and outer sides of the lump of dough being operated upon.

The action of the forming surfaces on the dough as just described is modified and the travel of the surface portion of the dough changed by the action of centrifugal force which tends to crowd every particle out to the periphery of the rotary head, and the action is further modified by the peripheral confining wall, practical observation showing that the lump of dough is worked around a diagonal axis and toward one of the poles with a corresponding flow to the center of the mass from the pole toward which the surface is caused to travel, the result being the formation of a practically smooth spherical lump with a perfect surface tension and with no loose or rough ends at any point.

To insure a proper grip on the dough by the forming surfaces, said surfaces are preferably covered for a portion of their area radially from the axis with canvas, as indicated at $f^2$ on the cover and $d^2$ on the radial head, but it is obvious that said surfaces may be roughened or made of such character that the dough will adhere thereto rather than slide freely over the same. The latter condition is desirable throughout that portion of the forming apparatus which constitutes the peripheral restraining wall inasmuch as the dough must, of necessity, have a sliding action over this portion of the surface, or at least it must free itself readily from the surface at the periphery, and hence the peripheral walls or flanges and the outer portions of the forming surfaces are left relatively smooth. To discharge the formed lump it is only necessary to lift the upper former when the lump will be thrown out by centrifugal force, an opening H being formed in the side wall if so desired.

Having thus described the invention, what is claimed, is:

1. A dough forming machine, embodying a rotary head constituting one forming surface and a relatively fixed cover constituting the other forming surface said surfaces being substantially parallel and an unbroken annular peripheral confining wall, whereby the lump of dough being formed is held against radial movement under the influence of centrifugal force.

2. An apparatus for forming dough embodying a rotary head having an upwardly extending unbroken annular peripheral flange and a coöperating former movable toward and from the rotary head, and between which and the rotary head the lump of dough being formed is confined said coöperating former having a central entrance opening and a peripheral exit opening for the lumps of dough.

3. An apparatus for forming dough embodying a horizontal rotary head having an upwardly extending annular unbroken peripheral flange a coöperating former having a central entrance opening and a peripheral flange for inclosing the head, the opposing forming faces of the former and head being arranged in substantial parallelism and means whereby the head and coöperating former may be separated to discharge the dough.

4. A dough forming machine embodying a rotary head of relatively small diameter mounted on a vertical axis and having a forming face downwardly inclined from the axis and a confining wall curving upwardly into a peripheral flange and a coöperating former having a downwardly extending peripheral flange and a forming face lying in substantial parallelism with the forming face of the rotary head.

5. A dough forming machine embodying a rotary head mounted on a vertical axis and having a dish-shaped recess in its upper face, of a coöperating former movable toward and from the head and having a centrally arranged entrance aperture for the dough to be formed.

6. A dough forming machine embodying a rotary head mounted on a vertical axis and having a dish-shaped recess in its upper face, a coöperating former held against rotation but movable toward and from the rotary head, said coöperating former having a peripheral embracing flange for the head and a central entrance aperture for the dough to be formed, substantially as described.

FRANK HENRY VAN HOUTEN.

Witnesses:
 HOWARD B. WILTSE,
 C. VAN NOSTRAN.